H. STILLMAN.
CAR BRAKE.
APPLICATION FILED SEPT. 2, 1911.

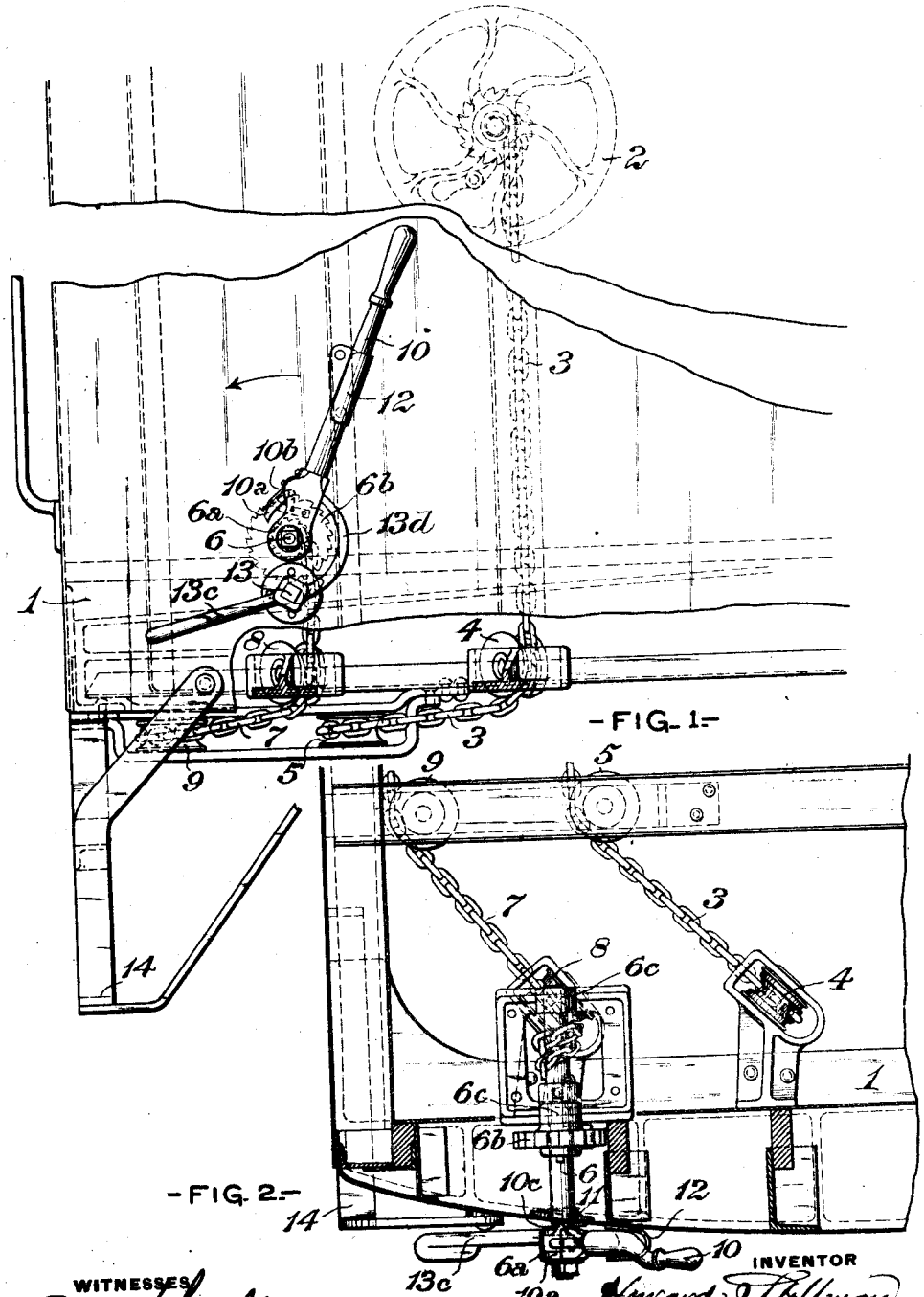

1,034,659.

Patented Aug. 6, 1912.
2 SHEETS—SHEET 2.

WITNESSES

INVENTOR
Howard Stillman

UNITED STATES PATENT OFFICE.

HOWARD STILLMAN, OF BERKELEY, CALIFORNIA.

CAR-BRAKE.

1,034,659.    Specification of Letters Patent.    Patented Aug. 6, 1912.

Application filed September 2, 1911. Serial No. 647,440½.

*To all whom it may concern:*

Be it known that I, HOWARD STILLMAN, of Berkeley, in the county of Alameda and State of California, have invented a certain new and useful Improvement in Car-Brakes, of which improvement the following is a specification.

My invention relates to means for manually effecting the application of brakes on railroad cars, and its object is to provide an appliance whereby the brakes of a car may be set from the outside of the car, while the car is in motion, by a brakeman riding on the side sill step, and the brakes be quickly and positively applied from the outside of the car, without interference with the means in the inside of the car for manually applying the brakes or with the air brake system, and without requiring the brakeman to go inside the car.

The improvement claimed is hereinafter fully set forth.

Figure 4:
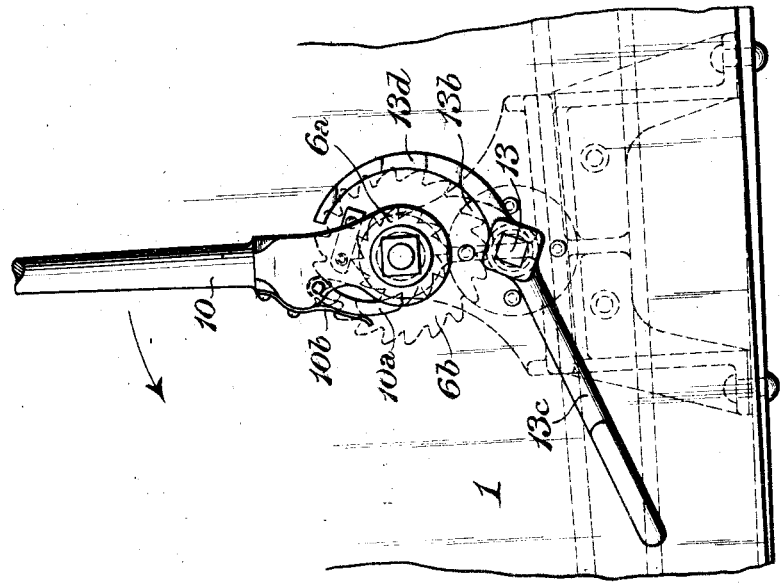
Figure 3:
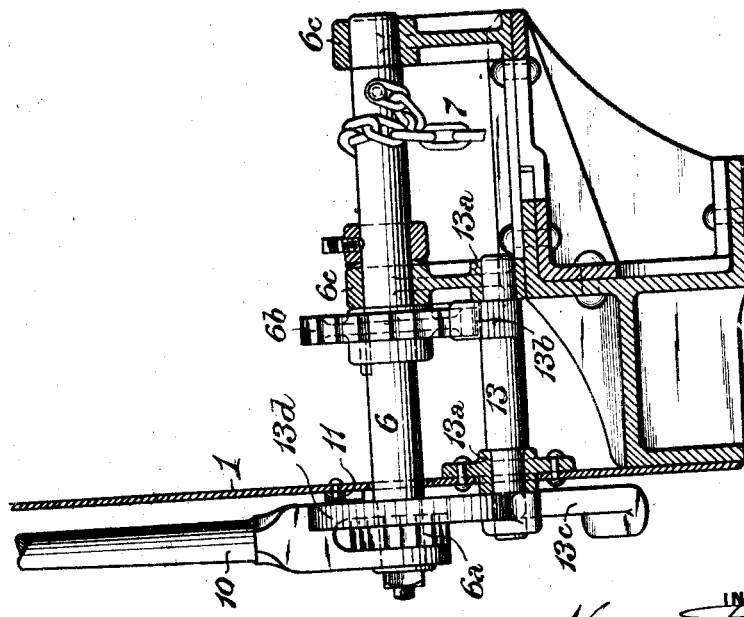

In the accompanying drawings: Figure 1 is a view, in elevation, of the blind end of a mail or baggage car, illustrating an application of my invention; Fig. 2, a horizontal section through the same; Fig. 3, a longitudinal central section, on an enlarged scale, through the supports of the ratchet mechanism, with the latter in elevation; and, Fig. 4, a front view of the ratchet mechanism.

My invention is herein exemplified in connection with the ordinary means of manually applying brakes in the inside of a car body, 1, at the blind or non-vestibuled end thereof, the same consisting of a hand wheel, 2, indicated in dotted lines in Fig. 1, having its shaft, which is journaled on a suitable member of the car frame, connected to a brake chain, 3, which is wound on the shaft by the rotation of the hand wheel, and passes therefrom, around sheaves, 4 and 5, to the brake rigging, which may be of any of the well known forms, and, as it does not, in and of itself, form any part of my present invention, is not shown.

In order to enable the brakes to be applied, when required, from the outside of the car, while the car is in motion, and thereby to satisfactorily comply with the requirements of the rules of the Interstate Commerce Commission, I provide a horizontal brake chain shaft, 6, which is journaled in bearings, 6ᶜ, adjacent to the end of the car at which the shaft of the usual hand wheel, 2, is mounted, said shaft, 6, projecting through the end of the car, and being connected to a brake chain, 7, which, in its rotation, is wound upon it, and which passes around sheaves, 8 and 9, to the brake rigging, in the same manner as the brake chain of the usual hand wheel. An operating ratchet, 6ᵃ, and a locking ratchet, 6ᵇ, are fixed upon the shaft, 6, the operating ratchet, 6ᵃ, being located on the outside of the car and adjacent to the end of the shaft, 6. A ratchet lever, 10, journaled on the outer end of the shaft, 6, carries an operating pawl, 10ᵃ, which oscillates upon a pivot on the ratchet lever and is normally engaged with the teeth of the ratchet, 6ᵃ, by a spring, 10ᵇ. A lateral releasing dog or projection, 10ᶜ, formed on the pawl, 10ᵃ, is adapted to abut against a stop, 11, fixed to the car end, when the ratchet lever is moved into the position shown in Fig. 1, in which position it abuts against a lever stop, 12, fixed to the car end, and thereby to disengage the pawl from the teeth of the operating ratchet, 6ᵃ.

A pawl shaft, 13, journaled in bearings, 13ᵃ, below the brake chain shaft, carries a locking pawl, 13ᵇ, which is adapted to engage the locking ratchet, 6ᵇ, of the brake chain shaft, 6, and thereby to prevent the rotation of the latter in direction opposite to that imparted by the movement of the ratchet lever away from the lever stop, 12. The pawl shaft, 13, carries an operating handle, 13ᶜ, which is weighted on its outer end, by the movement of which, the pawl, 13ᵇ, may be released from the locking ratchet, 6ᵇ, and a curved arm, 13ᵈ, projecting in opposite direction to the handle, 13ᶜ, the outer end of said arm being so located as to be contacted with, and moved by the ratchet lever, 10, when the latter is brought up to or near the stop, 12, and thereby to rock the pawl shaft, 13, about its axis and release the locking pawl from the ratchet, 6ᵇ.

In applying the brakes, the brakeman, riding on the side sill step, 14, works the ratchet lever, 10, with his right hand, the movements of said lever in the direction of the arrow, Fig. 1, winding up the chain, 7, on the shaft, 6, and said shaft being held stationary, in the opposite movements of the lever, 10, by the locking pawl and ratchet, 13ᵇ and 6ᵇ. A few movements of the ratchet lever are sufficient to set the brakes, after which, if the ratchet lever be left in or near a vertical position, the brakes will remain applied, the brake chain shaft, 6, continuing to be held stationary by the locking pawl and ratchet. The brakes may be released, whenever desired, either by moving the operating handle, 13$^c$, so as to disengage the pawl, 13$^b$, from the ratchet, 6$^b$, or by moving the ratchet lever, 10, into contact with the stop, 12, in which position both the pawls, 10$^a$ and 13$^b$, will be disengaged from their respective ratchets.

It will be noted that the appliance above described and the usual inside hand brake wheel are independently operable, and have no relation one to the other, and that either may be used for applying the brakes without interference by the presence of the other; also that the brakes may be applied and released by fluid pressure mechanism in the ordinary manner, and that the requirements of the Interstate Commerce Commission, as to the provision of means for applying the brakes by hand while the car is in motion, are fully complied with by the use of my improvement.

I claim as my invention, and desire to secure by Letters Patent:

1. The combination, with a railroad car, of means for manually applying the brakes, operable from the inside of the car, means for manually applying the brakes, operable from a side sill step of the car, means for releasing the brakes, also operable from said step, and means for actuating said releasing means by the movement of the applying means to a determined position.

2. The combination, with a railroad car having a blind or non-vestibuled end, of a brake chain shaft journaled horizontally on and projecting through the blind end of the car body, a brake chain extending therefrom to a connection with the brake rigging of the car, an operating ratchet and a locking ratchet fixed on the brake chain shaft, a ratchet lever journaled on said shaft adjoining the outside of the car body, and operable, in a vertical plane, from a side step of the car, a pawl coupled to said lever and adapted to engage the operating ratchet, a pawl adapted to engage the locking ratchet, a lever stop fixed to the outside of the car body, and means for disengaging said pawls from their respective ratchets, to effect the release of the brake, when and whenever the ratchet lever is moved into contact with the lever stop, whereby such position of the ratchet lever is always an indication to a brakeman that the brake is released.

3. The combination, with a railroad car, of a brake chain shaft journaled on the car body, a brake chain extending therefrom to a connection with the brake rigging of the car, an operating ratchet and a locking ratchet, each fixed on the brake chain shaft, a ratchet lever journaled on the brake chain shaft outside the car body, a pawl coupled to said lever and adapted to engage the operating ratchet, a pawl shaft journaled adjacent to the brake chain shaft, a pawl on said shaft adapted to engage the locking ratchet of the brake chain shaft, and an operating handle fixed on said pawl shaft outside the car body for engaging and disengaging the pawl thereof and the locking ratchet.

4. The combination, with a railroad car, of a brake chain shaft journaled on the car body, a brake chain extending therefrom to a connection with the brake rigging of the car, an operating ratchet and a locking ratchet, each fixed on the brake chain shaft, a ratchet lever journaled on said shaft outside the car body, a pawl coupled to said lever and adapted to engage the operating ratchet, a pawl shaft journaled adjacent to the brake chain shaft, a pawl on said pawl shaft adapted to engage the locking ratchet of the brake chain shaft, and an arm fixed on said pawl shaft in position to contact with the ratchet lever at one extremity of the traverse thereof.

HOWARD STILLMAN.

Witnesses:
FRANK E. RUSSELL,
BEN BARTON.